US008843847B1

(12) United States Patent
Boyle et al.

(10) Patent No.: US 8,843,847 B1
(45) Date of Patent: Sep. 23, 2014

(54) SYSTEM AND METHOD FOR NATIVE APPLICATION CONTROL OF HTML5 CONTENT

(71) Applicant: Joingo, LLC, San Jose, CA (US)

(72) Inventors: Stephen S. Boyle, Lincoln, CA (US); Russell S. Greer, Los Gatos, CA (US); Thang Dao, San Jose, CA (US)

(73) Assignee: Joingo, LLC, San Jose, CA (US)

( * ) Notice: Subject to any disclaimer, the term of this patent is extended or adjusted under 35 U.S.C. 154(b) by 0 days.

(21) Appl. No.: 13/727,545

(22) Filed: Dec. 26, 2012

Related U.S. Application Data

(60) Provisional application No. 61/676,984, filed on Jul. 29, 2012.

(51) Int. Cl.
*G06F 3/048* (2013.01)
(52) U.S. Cl.
CPC ................................. *G06F 3/048* (2013.01)
USPC ............ 715/781; 726/29; 345/158; 709/219; 715/745

(58) Field of Classification Search
USPC ...................... 709/219; 715/781, 745; 726/29
See application file for complete search history.

(56) References Cited

U.S. PATENT DOCUMENTS

| 8,402,554 B2* | 3/2013 | Thomas et al. ................. 726/29 |
| 2008/0215675 A1 | 9/2008 | Kaminitz et al. |
| 2012/0036494 A1 | 2/2012 | Gurumohan et al. |
| 2012/0158472 A1 | 6/2012 | Singh et al. |
| 2012/0249424 A1* | 10/2012 | Bove et al. .................... 345/158 |
| 2012/0254791 A1* | 10/2012 | Jackson et al. ................ 715/781 |
| 2012/0257249 A1 | 10/2012 | Natarajan |

* cited by examiner

*Primary Examiner* — Kyung H Shin
(74) *Attorney, Agent, or Firm* — Clause Eight IPS; Michael Catania

(57) ABSTRACT

A method and system configured to use HTML5 layout for rendering a native downloaded graphical user interface is disclosed herein. The system is comprised of a mobile device, a native downloadable application, a mobile web services API, a native application authoring tool, and an HTML5 authoring tool. The HTML5 authoring tool is used to create an application layout conformant with the HTML5 standards and practices.

7 Claims, 5 Drawing Sheets

SYSTEM AND METHOD FOR NATIVE APPLICATION CONTROL OF HTML5 CONTENT

CROSS REFERENCES TO RELATED APPLICATIONS

The Present Application claims priority to U.S. Provisional Patent Application No. 61/676,984, filed on Jul. 29, 2012.

STATEMENT REGARDING FEDERALLY SPONSORED RESEARCH OR DEVELOPMENT

Not Applicable

BACKGROUND OF THE INVENTION

1. Field of the Invention

The present invention generally relates to mobile applications. More specifically, the present invention relates to a method and system to use HTML5 layout for rendering native downloaded graphical user interface.

2. Description of the Related Art

The iPHONE® mobile phone from Apple, Inc., of Cupertino, Calif. has an iOS platform. An app developer wishing to develop a mobile application for an iPHONE® mobile phone must create the mobile application using an iOS platform. An app developer needs a MACINTOSH® computer running SNOW LEOPARD™ operating system. The app developer also needs to become a registered IOS developer before being able to download the iOS software development kit ("SDK"). The app developer also needs to download the XCODE™ integrated development environment ("IDE"). The app developer will also use the COCOA TOUCH application environment. Also, the mobile app must be certified by Apple.

If the app developer wishes to have that mobile application available for an ANDROID® phone, then the app developer must create a new mobile application using an ANDROID operating platform. The app developer will need a JAVA® development kit ("JDK"), ECLIPSE™ IDE, the ANDROID® SDK, and the ANDROID development tools plug-in.

Some of the differences between just these two platforms include multitasking, widgets, application market restrictions (Apple must certify all iOS apps), notifications, multiple hardware devices (only Apple devices use the iOS platform), editable ROMS (the iPHONE® mobile phone has a read-only memory), and setting changes.

Thus, it is impossible for an application coded for an iOS platform to be used on an ANDROID platform.

General definitions for terms utilized in the pertinent art are set forth below.

GSM, Global System for Mobile Communications is a second generation digital cellular network.

Code Division Multiple Access ("CDMA") is a spread spectrum communication system used in second generation and third generation cellular networks, and is described in U.S. Pat. No. 4,901,307.

Long Term Evolution ("LTE") is a next generation communication network.

Interactive voice response ("IVR") is a telephone technology in which a user uses a phone to interact with a database to acquire information.

Short Message Service ("SMS") is text messaging communication using a mobile phone or other device to send messages up to 160 characters in length.

Multimedia messaging service ("MMS") communication is a communication transmitted to and from a mobile phone that includes a multimedia content such as a digital photograph (JPEG), videos, and the like.

A SMS Gateway is used to send text messages with or without a mobile phone, and is used by aggregators to forward text messages to mobile phones.

BLUETOOTH technology is a standard short range radio link that operates in the unlicensed 2.4 gigaHertz band.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Telephone Consumer Protection Act ("TCPA") of 1991 restricts the use of SMS text messages received by mobile phones, and SMS messages sent without a consumer's consent can violate the TCPA.

APP is a software application for a mobile phone such as a smart phone.

Hypertext Transfer Protocol ("HTTP") is a set of conventions for controlling the transfer of information via the Internet from a web server computer to a client computer, and also from a client computer to a web server.

Internet is the worldwide, decentralized totality of server computers and data-transmission paths which can supply information to a connected and browser-equipped client computer, and can receive and forward information entered from the client computer.

FTP or File Transfer Protocol is a protocol for moving files over the Internet from one computer to another.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

Transfer Control Protocol/Internet Protocol ("TCP/IP") is a protocol for moving files over the Internet.

A SMS aggregator is an entity that provides connectivity with a mobile phone carrier by offering a SMS gateway to send and receive messages and other digital content.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Direct Inward Dialing ("DID") involves a carrier providing one or more trunk lines to a customer for connection to the customer's private branch exchange ("PBX") and a range of telephone lines are allocated to this line.

Voice over Internet Protocol ("VoIP") relates to communications transmitted over the Internet such as SKYPE.

HyperText Markup Language (HTML) is a method of mixing text and other content with layout and appearance commands in a file, so that a browser can generate a display from the file.

HTML5 specification is a markup language and the latest revision of HTML from the W3C organization.

JavaScript is an object-based programming language. JavaScript is an interpreted language, not a compiled language. JavaScript is generally designed for writing software routines that operate within a client computer on the Internet.

XHTML (Extensible Hypertext Markup Language) is a language for describing the content of hypertext documents intended to be viewed or read in a browser.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

There is a need to use HTML 5 layout for rendering native downloaded graphical user interface.

BRIEF SUMMARY OF THE INVENTION

The present invention is a method and system configured to use HTML5 layout for rendering native downloaded graphical user interface. The system is comprised of a mobile device, a native downloadable application, a mobile web services API, a native application authoring tool, and an HTML5 authoring tool. The HTML5 authoring tool is used to create an application layout conformant with the HTML5 standards and practices. The native application authoring tool is used to develop the native application and include the HTML5 layout as a resource file in the process of building the native application whereby the HTML5 is embedded into the native application and will be downloaded as part of the native application when the end-user downloads the application from an Application Store such as Apple AppStore. When the native application starts, it opens a browser view and indexes the browser to the embedded HTML5 layout. As the browser view executes the HTML5 layout and requests more information, possibly due to a button press, the native application intercepts the request and has an option of satisfying it from the resources included in the downloaded file. If the request has been made to one of the native application features supported in the mobile web services API, the request can be satisfied without going outside of the device to the network.

One aspect of the present invention is a system configured to use HTML5 layout for rendering native downloaded graphical user interface. The system includes a mobile communication device comprising a browser, a native downloadable application, a mobile web services API, a HTML 5 authoring tool, a native application authoring tool, and an application site. The HTML 5 authoring tool is utilized to create an application layout conformant with HTML5 standards and practices. The native application authoring tool is utilized to develop the native downloadable application and comprises an HTML5 layout as a resource file in the process of building the native downloadable application whereby the HTML5 layout is embedded into the native downloadable application. The application site comprises at least the native downloadable application. The native downloadable application is downloadable from the application site to the mobile communication device. The native downloadable application opens a browser view and indexes the browser to the embedded HTML5 layout. The browser view is configured to execute the HTML5 layout and transmit a request for more information. The native downloadable application is configured to intercept the request, and the native downloadable application is configured to satisfy the request from a plurality of resources included in a downloaded file. The request made to one of a plurality of native downloadable application features supported in the mobile web services API is satisfied without going outside of the mobile communication device to a network.

Another aspect of the present invention is a method to use HTML5 layout for rendering native downloaded graphical user interface. The method includes downloading a native downloadable application from an application site to a mobile communication device. The native downloadable application comprises an embedded HTML5 layout. A native application authoring tool utilized to develop the native downloadable application comprises the HTML5 layout as a resource file in the process of building the native downloadable application. The method also includes accessing the native downloadable application on the mobile communication device. The method also includes opening a browser view in the native downloadable application. The method also includes indexing a browser of the mobile communication device to the embedded HTML5 layout. The method also includes executing the HTML5 layout. The method also includes requesting more information in a request from the browser view. The method also includes intercepting the request from the browser view by the native downloadable application. The method also includes satisfying the request with resources included in a downloaded file. The method also includes presenting the native downloadable application content on the mobile communication device in a HTML5 layout.

Yet another aspect of the present invention is a system for using an HTML5 layout for rendering native downloaded graphical user interface. The system includes a native application authoring tool, at least one communication network, a mobile service provider server for communications over the at least one communication network, a content server and a plurality of mobile communication devices. The native application authoring tool comprises an embedded HTML5 layout. The native application authoring tool is utilized to develop the native downloadable application comprising the HTML5 layout as a resource file in the process of building the native downloadable application. The content server is in communication with the mobile service provider server. The content server comprises the at least one native downloadable application. Each of the plurality of mobile communication devices comprises a format for a mobile application content. Each of the plurality of mobile communication devices is capable of communicating over the at least one communication network. Each of the mobile communication devices comprises a browser. The native downloadable application is downloaded from the content server to each of the mobile communication devices. The native downloadable application opens a browser view and indexes the browser to the embedded HTML5 layout. The browser view executes the HTML5 layout and requests more information. The native downloadable application intercepts the request, and the native downloadable application is capable of satisfying the request from a plurality of resources included in a downloaded file. A request made to one of a plurality of native downloadable application features supported in the mobile web services API is satisfied without going outside of each of the mobile communication devices to the network.

Yet another aspect of the present invention is a mobile communications device comprising a native downloadable application. The native downloadable application is downloaded from the content server to each of the mobile communication devices. The native downloadable application opens a browser view and indexes the browser to the embedded HTML5 layout. The browser view executes the HTML5 layout and requests more information. The native downloadable application intercepts the request, and the native downloadable application is capable of satisfying the request from a plurality of resources included in a downloaded file. A request made to one of a plurality of native downloadable application features supported in the mobile web services API is satisfied without going outside of each of the mobile communication devices to the network.

The native application is preferably selected from an IPHONE mobile application content format, an ANDROID mobile application content format, and a BLACKBERRY mobile application content format. The mobile communication device is preferably a mobile phone or a tablet computer. The application site is preferably an application store comprising a plurality of downloadable application. The HTML layout preferably comprises HTML markup. The HTML layout preferably comprises associated JavaScript. The request for more information is preferably a user driven request. The request for more information is alternatively a JavaScript request.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
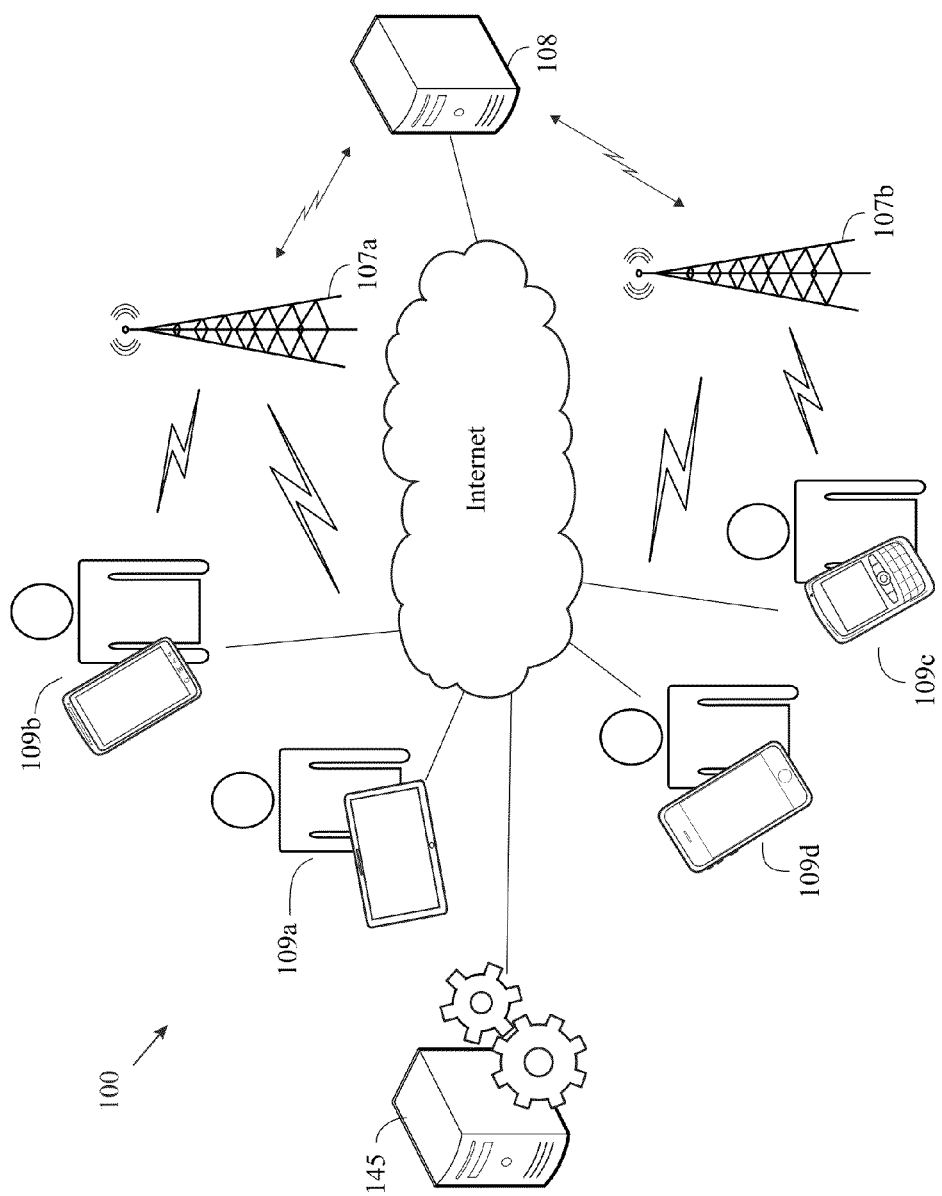
FIG. 1 is a block diagram of a system configured to use HTML5 layout for rendering native downloaded graphical user interface.

As shown in FIG. 1, a system configured to use HTML5 layout for rendering native downloaded graphical user interface is generally designated 100. The native downloadable application is downloaded from the application site 145 to mobile communication devices 109a, 109b, 109c and 109d over the Internet or over a communication network 108 through cell towers 107z and 107b. The application site can be an application store like the APPLE® APP STORE™ application site, the ANDROID MARKET application store, or it can be a stand-alone site for downloading an application. Those skilled in the art will recognize that the application site can be other similar sites without departing from the scope and spirit of the present invention. The native downloadable application opens a browser view and indexes the browser to the embedded HTML5 layout. The embedded HTML5 layout preferably includes HTML5 markup and/or associated JavaScript. The browser view executes the HTML5 layout and requests more information. The native downloadable application intercepts the request, and the native downloadable application is capable of satisfying the request from a plurality of resources included in a downloaded file, wherein a request made to one of a plurality of native downloadable application features supported in the mobile web services API is satisfied without going outside of the mobile communication device to a network.

Figure 2:
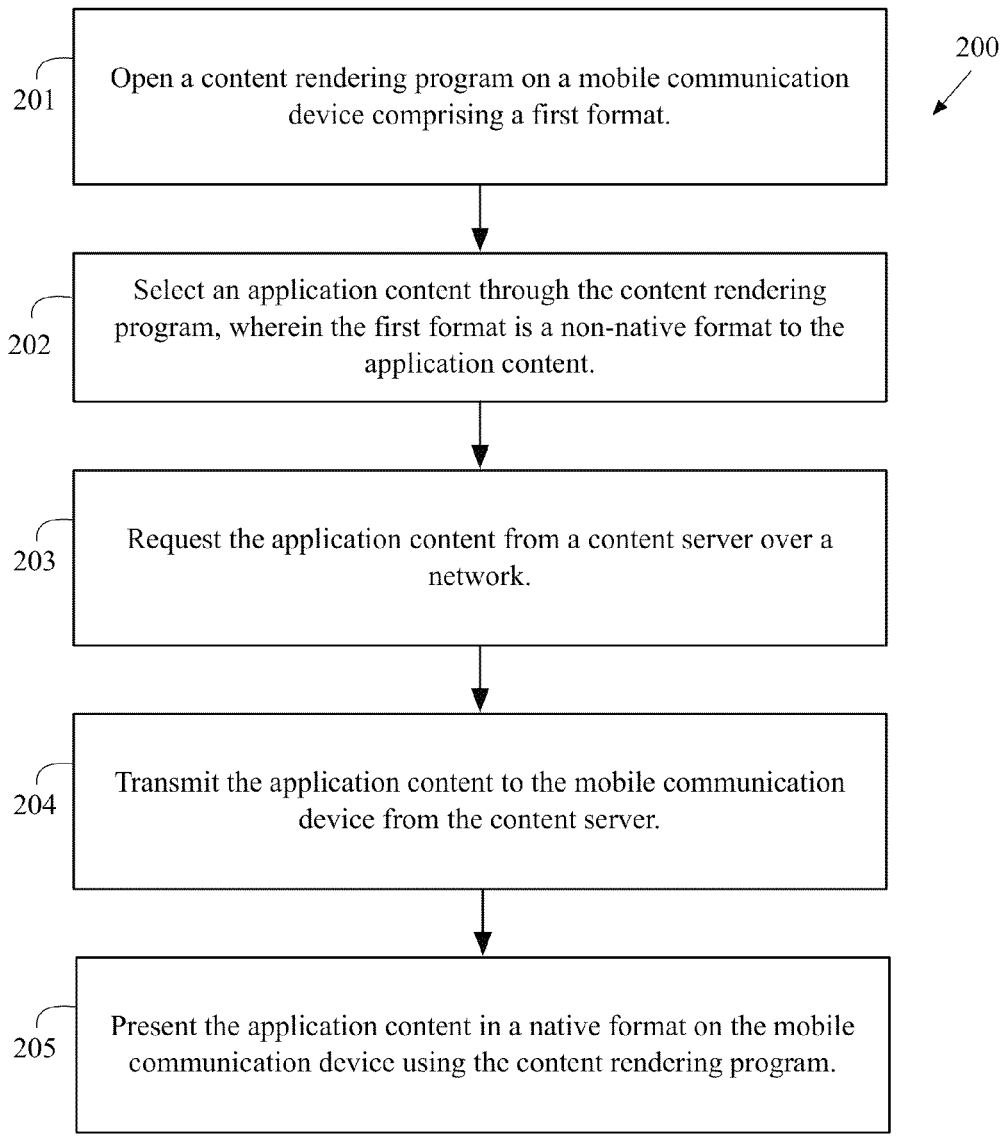
FIG. 2 is a flow chart of a method to use HTML5 layout for rendering native downloaded graphical user interface.

A flow chart of a general method 200 to use HTML5 layout for rendering native downloaded graphical user interface is shown in FIG. 2. At block 201, a content rendering program is opened on a mobile communication device comprising a first format platform, like an APPLE iOS or an ANDROID operating system. At block 202, an application content is selected through the content rendering program, and the application content is in a non-native format. At block 203, the application content is requested from a content server over a network. At block 204, the application content is transmitted to the mobile communication device from the content server. The content server may be an application store, such as the APPLE® APP STORE™ application store. At block 205, the application content is presented on the mobile communication device in a native format to the mobile communication device using the content rendering program.

Figure 3:
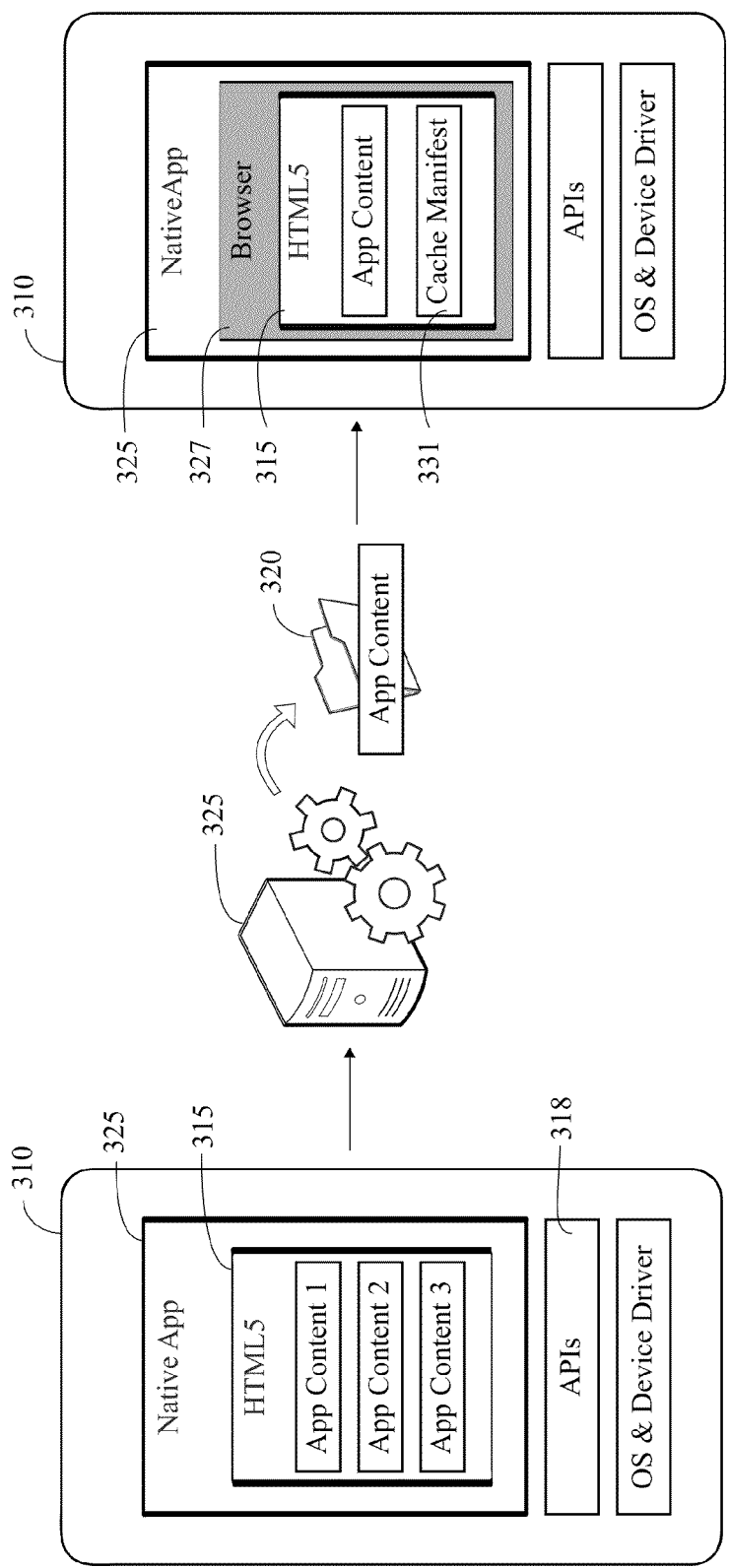
FIG. 3 is an illustration of a mobile communication device opening a native downloadable application comprising an embedded HTML5 layout.

As shown in FIG. 3, a system is preferably comprised of a mobile device 310, a native downloadable application 325, a mobile web services API 318, a native application authoring tool, and an HTML5 authoring tool. The HTML5 authoring tool is used to create an application layout conformant with the HTML5 standards and practices. The native application authoring tool is used to develop the native application and include the HTML5 layout as a resource file in the process of building the native application whereby the HTML5 is embedded into the native application and will be downloaded as part of the native application when the end-user downloads the application from an application store such as APPLE® APP STORE™ application store.

When the native application 325 starts, the native application opens a browser view 327 and indexes the browser to the embedded HTML5 layout. As the browser view 327 executes the HTML5 layout 315 and requests more information, possibly due to a button press or a JavaScript request, the native application 325 intercepts the request and has an option of satisfying the request from the resources included in the downloaded file, such as a cache manifest 331. If the request has been made to one of the native application features supported in the mobile web services API, the request can be satisfied without going outside of the device to the network.

Figure 4:
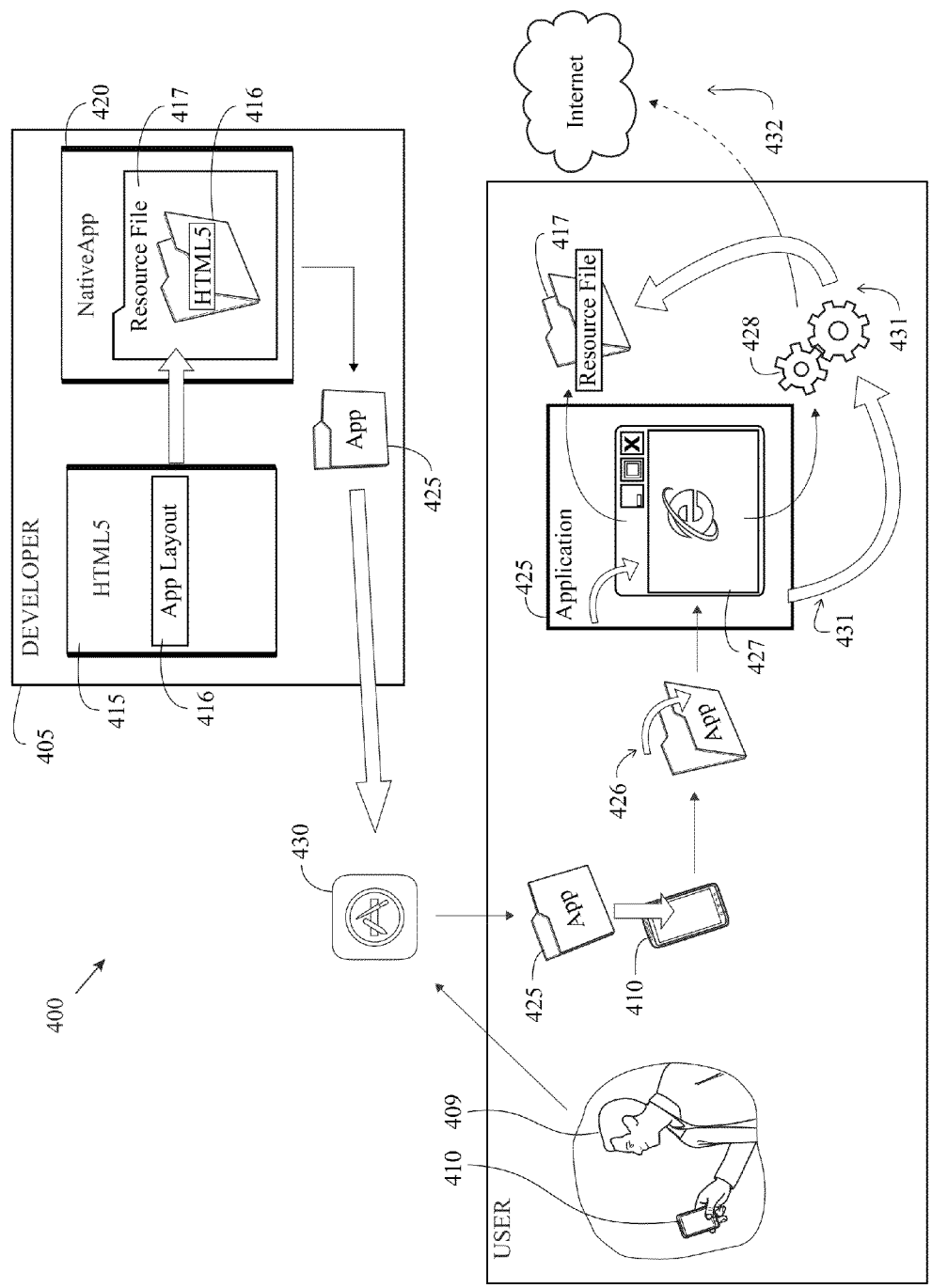
FIG. 4 is a block diagram of a system configured to use HTML5 layout for rendering native downloaded graphical user interface.

FIG. 4 illustrates a system and method 400 of using HTML5 layout for rendering a native downloaded graphical user interface (GUI). An application 425 includes an embedded HTML5 layout 416, and a native application authoring tool 420 comprising the HTML5 layout 416 as a resource file 417. An application developer 405 packages everything into an application 425 that is eventually uploaded to an application site 430, such as the APPLE® APP STORE™ application store, to be made available for downloading.

A user 409 uses a mobile communication device 410, such as a smartphone, to connect to an application site 430 to download an application 425. After downloading the application 425, the user runs 426 the application 425 from the smartphone 410. The application opens a browser window 427 within the native application 425, indexing a browser of the smartphone 410 to the embedded HTML5 layout, and executes the HTML5 layout as the application's GUI. When the application requests more information 428 from the browser, the browser initially would attempt to connect to the internet 432, however, the request is intercepted 431 by the native application 425 and redirected to the resource file that was included with the application download. The application content is presented in an HTML5 layout.

The mobile communication device utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") or other similar protocols. The transmission protocol ranges from SIP to MGCP to FTP and beyond. The protocol at the server is preferably HTTP.

A mobile communication service provider (aka phone carrier) of the customer such as VERIZON, AT&T, SPRINT, T-MOBILE, and the like mobile communication service providers, provide the communication network for communication to the data capable communication device of the customer.

Figure 5:
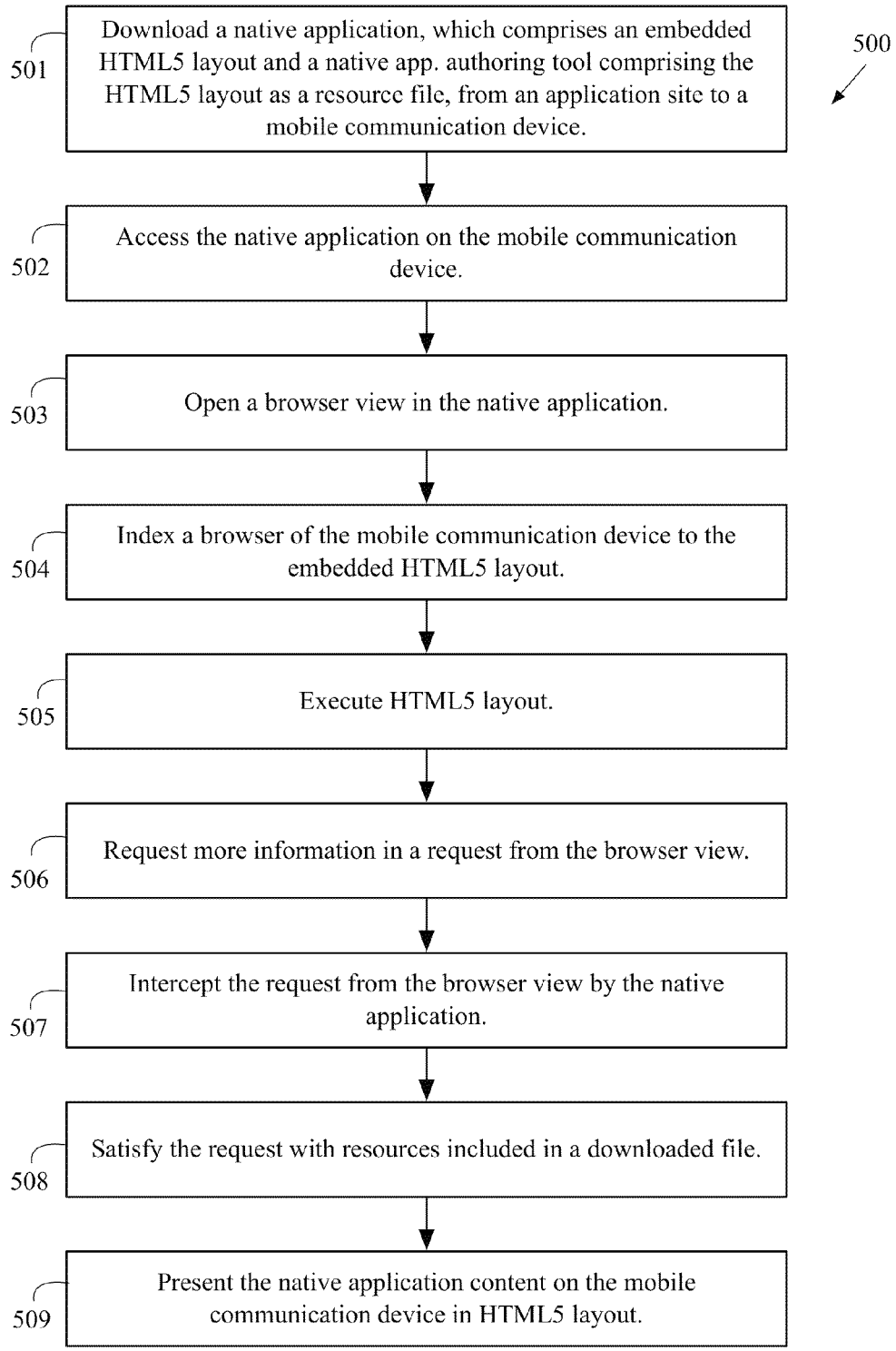
FIG. 5 is a flow chart of a method to use HTML5 layout for rendering native downloaded graphical user interface.

A flow chart for a method 500 is shown in FIG. 5. At block 501, a user downloads an application from an application site to the user's mobile communication device, such as a smartphone. Within the application is an embedded HTML5 layout and a native application authoring tool comprising the HTML5 layout as a resource file in the process of building the native downloadable application. At block 502, the user opens or runs the application on the smartphone. The application opens a browser within the application at block 503, and indexes a browser of the smartphone to the embedded HTML5 layout, at block 504. At block 505, the HTML5 layout is run and as the browser requests more information at block 506, the application intercepts the request from the browser at block 507, before the request is sent out to a connection, such as the internet. At block 508, the request is satisfied with the resources that were included in the download, and the application content is then presented in HTML5 layout on the smartphone, at block 509.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A system configured to use HTML5 layout for rendering a native downloaded graphical user interface, the system comprising:

a mobile communication device;

a native downloadable application;

a mobile web services API;

a HTML 5 authoring tool utilized to create an application layout conformant with HTML5 standards and practices;

a native application authoring tool utilized to develop the native downloadable application and comprising an HTML5 layout as a resource file in a process of building the native downloadable application whereby the HTML5 layout is embedded into the native downloadable application; and an application server comprising at least the native downloadable application;

wherein the native downloadable application is downloaded from the application server over a network to the mobile communication device, the native downloadable application is configured to run on the mobile communication device and is configured to be displayed on the mobile communication device, the native downloadable application is configured to open a browser view within the native downloadable application on the mobile communication device when the native downloadable application is running and displayed on the mobile communication device, the browser view configured to execute the HTML5 layout as the graphical user interface of the native downloadable application and transmit a request for information to a server over a network, wherein the HTML 5 layout is part of the native downloadable application and operates with the native downloadable application, the native downloadable application configured to intercept the request for information, and the native downloadable application configured to satisfy the request from a plurality of resources included in a downloaded file, wherein a request made to one of a plurality of native downloadable application features supported in the mobile web services API is satisfied without going outside of the mobile communication device to a network, wherein an application content is presented in an HTML5 layout on the mobile communication device.

2. The system according to claim 1 wherein the native application is selected from an IPHONE mobile application content format, an ANDROID mobile application content format, and a BLACKBERRY mobile application content format.

3. The system according to claim 1 wherein the request for information is a user driven request.

4. The system according to claim 1 wherein the request for information is a JavaScript request.

5. The system according to claim 1 wherein the application server comprises an application store comprising a plurality of downloadable application.

6. The system according to claim 1 wherein the HTML layout comprises HTML markup.

7. The system according to claim 1 wherein the HTML layout comprises associated JavaScript.

\* \* \* \* \*